United States Patent
Toh et al.

(10) Patent No.: US 7,536,786 B2
(45) Date of Patent: May 26, 2009

(54) METHOD FOR REPLACING AN OPEN-CLOSE VALVE FOR A HYDROGEN STORAGE TANK

(75) Inventors: Keiji Toh, Kariya (JP); Daigoro Mori, Mishima (JP)

(73) Assignees: Kabushiki Kaisha Toyota Jidoshokki, Kariya-shi (JP); Toyota Jidosha Kabushiki Kaisha, Toyota-shi (JP)

(*) Notice: Subject to any disclaimer, the term of this patent is extended or adjusted under 35 U.S.C. 154(b) by 225 days.

(21) Appl. No.: 11/666,065

(22) PCT Filed: Oct. 13, 2005

(86) PCT No.: PCT/JP2005/018893

§ 371 (c)(1),
(2), (4) Date: Apr. 19, 2007

(87) PCT Pub. No.: WO2006/043468

PCT Pub. Date: Apr. 27, 2006

(65) Prior Publication Data

US 2008/0115362 A1    May 22, 2008

(30) Foreign Application Priority Data

Oct. 20, 2004    (JP) ................. 2004-305847

(51) Int. Cl.
*B23P 6/00* (2006.01)
*B21K 1/20* (2006.01)

(52) U.S. Cl. ........................ 29/890.121; 29/890.124; 29/401.1; 29/402.03; 29/402.08

(58) Field of Classification Search ............ 29/890.121, 29/890.124, 401.1, 402.03, 402.08, 404
See application file for complete search history.

(56) References Cited

U.S. PATENT DOCUMENTS 4,881,375 A  * 11/1989  Mattiola et al. ............ 62/50.6

(Continued)

FOREIGN PATENT DOCUMENTS

DE    4105347 A1  *  8/1992

(Continued)

OTHER PUBLICATIONS

English translation of the International Preliminary Report on Patentability dated Jun. 14, 2007, Application No. PCT/JP2005/018893.

(Continued)

*Primary Examiner*—Jermie E Cozart
(74) *Attorney, Agent, or Firm*—Locke Bissell & Liddell LLP

(57) ABSTRACT

A hydrogen storage tank (11) and method for replacing an open-close valve that prevents oxidizing of a hydrogen absorption alloy (MH) accommodated in a tank body (12) when replacing an open-close valve (30) connected to a hydrogen supply-release pipe (28) extending from a tank body (12). The hydrogen storage tank (11) includes a tank body (12) accommodating hydrogen absorption material (MH), a hydrogen supply-release pipe (28) for supplying hydrogen gas to the tank body (12) and releasing hydrogen gas from the tank body (12), and a gas supply pipe (24) for supply inert gas to the tank body (12) and arranged independently from the hydrogen supply-release pipe (28). The method for replacing an open-close valve (30) connected to the hydrogen supply-release pipe (28) includes supplying inert gas through a gas supply pipe (24) to the tank body (12) and replacing the open-close valve in a state in which inert gas can be released from the hydrogen supply-release pipe (28).

7 Claims, 3 Drawing Sheets

U.S. PATENT DOCUMENTS 6,378,188 B1 * 4/2002 Biess .................. 29/402.09
6,733,563 B2 * 5/2004 Fujita et al. .................. 75/352
2004/0182869 A1 9/2004 Kubo et al.

FOREIGN PATENT DOCUMENTS

| JP | 2001-248793 | 9/2001 |
|---|---|---|
| JP | 2002-250496 | 9/2002 |
| JP | 2003-139298 | 5/2003 |
| JP | 2004-270861 | 9/2004 |

OTHER PUBLICATIONS

International Search Report based on corresponding PCT application No. PCT/JP2005/018893 (Publication No. WO 2006/043468 A1), published Apr. 27, 2006.

* cited by examiner

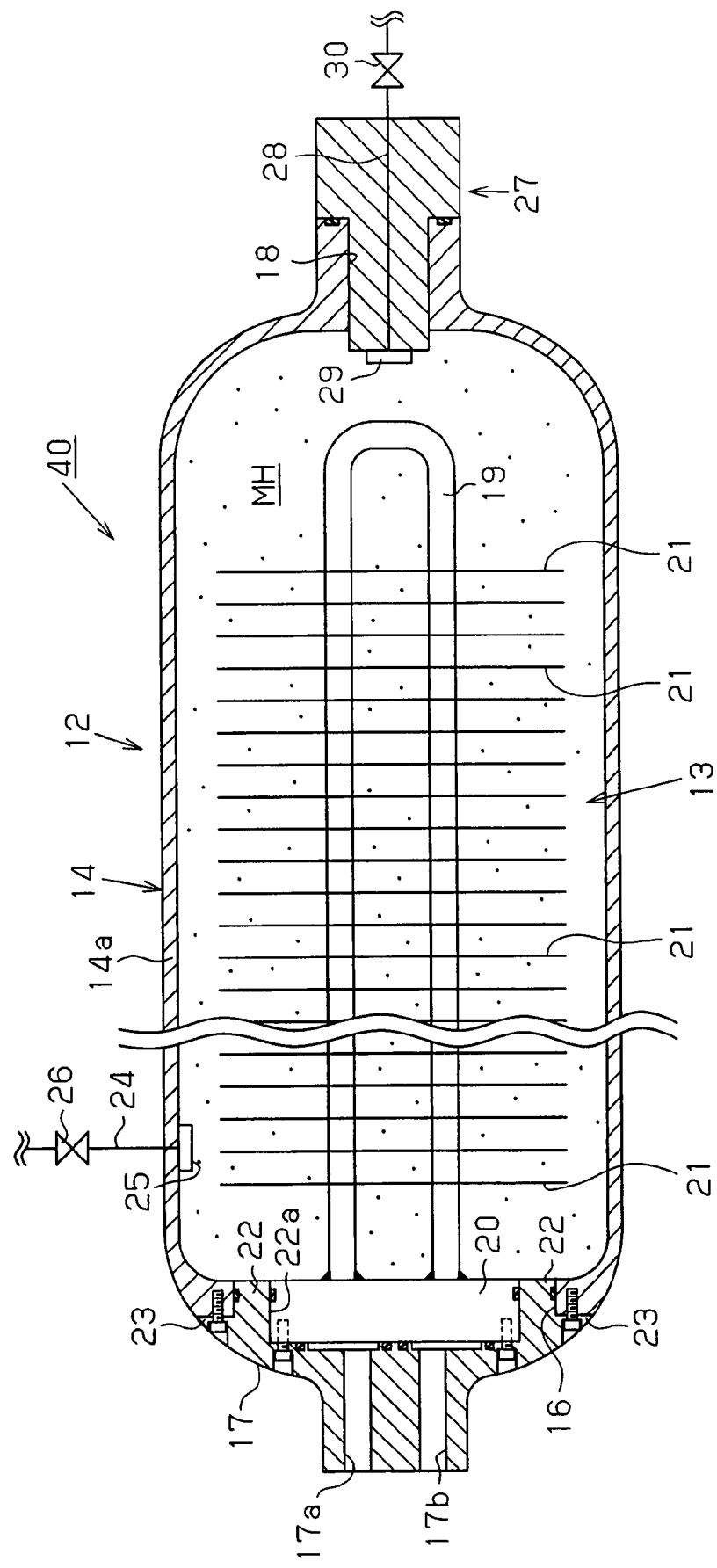

METHOD FOR REPLACING AN OPEN-CLOSE VALVE FOR A HYDROGEN STORAGE TANK

FIELD OF THE INVENTION

The present invention relates to a hydrogen storage tank including a tank body accommodating hydrogen absorption material, and a method for replacing an open-close valve for opening and closing a passage that extends from the tank body of the hydrogen storage tank.

BACKGROUND OF THE INVENTION

In recent years, awareness of the need to reduce global warming has increased. To reduce carbon dioxide emissions from vehicles, fuel cell powered vehicles and hydrogen vehicles using hydrogen as fuel such as a hydrogen engine automobile are being developed. A hydrogen storage tank for storing hydrogen gas is installed in hydrogen vehicles. There is a known hydrogen storage tank that accommodates, for example, powdered hydrogen absorption alloy in a tank body.

Patent document 1 discloses a hydrogen storage tank including a hydrogen supply passage and a hydrogen release passage extending from a tank body. Hydrogen gas is supplied to the tank body from a hydrogen supply unit installed at a hydrogen station through the supply passage, and the hydrogen gas in the tank body is discharged through the discharge passage and supplied to a fuel cell. An open-close valve for opening and closing a passage is arranged in each passage. The supply of hydrogen gas to the tank body and the discharge of hydrogen gas from the tank body are carried out by opening and closing each passage with the corresponding open-close valve.

In the hydrogen storage tank accommodating the hydrogen absorption alloy, a filter is attached to the outlet of the supply passage and to the inlet of the discharge passage so that the hydrogen absorption alloy does not move out of the tank body and into the passages. However, a certain type of hydrogen absorption alloy is pulverized to a size of about 1 μm and thus cannot be completely kept in the tank with only the filters. The hydrogen absorption alloy that enters the passages deposits in the open-close valve. As a result, the open-close valve may fail to function properly. Further, an electromagnetic valve is often used as the open-close valve. However, such an electromagnetic valve may have an electrical failure such as a disconnected wire. An open-close valve must be replaced if it fails to function.

The hydrogen absorption alloy has a property of being easily oxidized when exposed to air. Thus, when replacing the open-close valve, a generally employed method would be to completely discharge the hydrogen gas from the tank body and then supplying and filling the tank body with inert gas. However, in such a method, the open-close valve is removed after the inert gas is supplied. Thus, there is a possibility that air may enter the tank body if the inert gas leaks out from the tank body before completing the replacement of the open-close valve. Therefore, there still is a possibility of the hydrogen absorption alloy in the tank body being exposed to air, and this method is thereby inadequate as a means for inhibiting oxidation and deterioration of the hydrogen absorption alloy.

Patent Document 1: Japanese Laid-Open Patent Publication No. 2003-139298

SUMMARY OF THE INVENTION

It is an object of the present invention to provide a hydrogen storage tank and a method for replacing an open-close valve that prevent oxidizing of hydrogen absorption material accommodated in a tank body.

To achieve the above object, the present invention provides a hydrogen storage tank including a tank body accommodating hydrogen absorption material, a main passage used to supply hydrogen gas to the tank body and release hydrogen gas from the tank body, and a sub-passage used to supply inert gas to the tank body and arranged independently from the main passage.

The present invention further provides a method for replacing an open-close valve for a hydrogen storage tank. The hydrogen tank includes a tank body accommodating hydrogen absorption material and a main passage used to supply hydrogen gas to the tank body and release hydrogen gas from the tank body. The open-close valve is connected to the main passage to open and close the main passage. The method includes arranging a sub-passage in the hydrogen storage tank independently from the main passage, releasing hydrogen gas from the tank body through the main passage by opening the main passage with the open-close valve in a state in which the sub-passage is closed, supplying inert gas through the sub-passage to the tank body from which hydrogen gas has been released by opening the sub-passage, replacing the open-close valve while continuing to supply inert gas to the tank body, discharging inert gas from the tank body through the main passage or the sub-passage after the open-close valve is replaced, and supplying hydrogen gas to the tank body through the main passage after the open-close valve is replaced.

BRIEF DESCRIPTION OF THE DRAWINGS

FIG. 4 is a schematic cross-sectional view of a hydrogen storage tank according to a third embodiment of the present invention.

DETAILED DESCRIPTION OF THE PREFERRED EMBODIMENTS

First Embodiment

A first embodiment of the present invention will now be described with reference to FIGS. 1 and 2.

Figure 1:
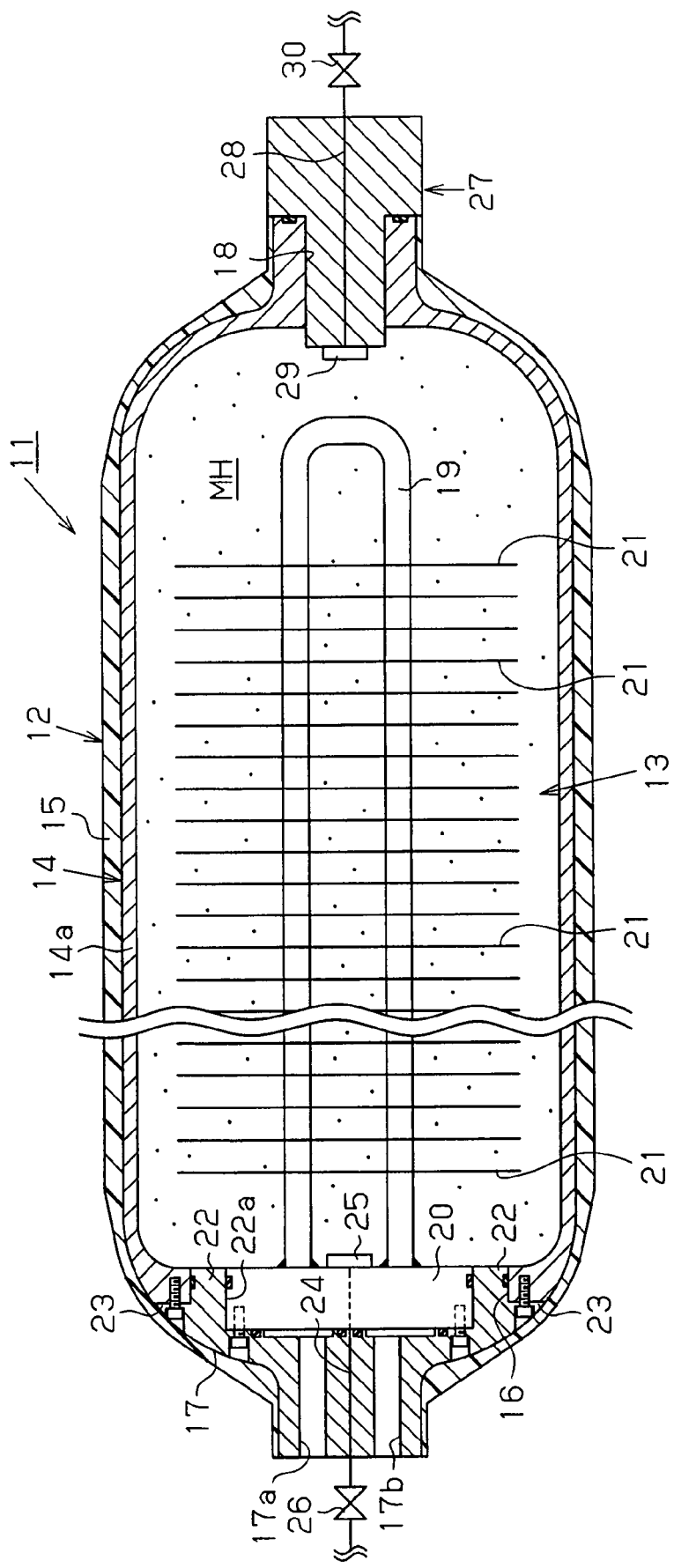
FIG. 1 is a schematic cross-sectional view of a hydrogen storage tank according to a first embodiment of the present invention.

As shown in FIG. 1, the hydrogen storage tank 11 includes a tubular (cylindrical in the present embodiment) tank body 12 and a heat exchanger 13 accommodated in the tank body 12. The tank body 12 is formed by applying a fiber reinforced resin layer 15 to the outer surface of a hollow liner 14. The fiber reinforced resin layer 15 generally covers the entire outer surface of the liner 14. Hydrogen gas is stored in the hydrogen storage tank 11 at a pressure above the atmospheric pressure.

The liner 14 is formed from, for example, aluminum alloy and ensures the hermetic seal of the hydrogen storage tank 11. The liner 14 is relatively elongated. The liner 14 has one end (basal end), or the left end as viewed in FIG. 1 that is dividable. In other words, the liner 14 includes a main body 14a, which is generally tubular, and a cap 17, which covers an opening 16 at the basal end side of the main body 14a. A plug 27 is fixed to an opening 18 at the other end (distal end) of the liner 14. Hydrogen gas is supplied to and released from the tank body 12 through the plug 27, as will be described in detail later. The two openings 16 and 18 (i.e., cap 17 and plug 27) are arranged at opposite sides of the main body 14a. That is, the main body 14a is a hollow tube having open opposite ends.

In the present embodiment, the fiber reinforced resin layer 15 is formed from CFRP (carbon fiber reinforced plastic), which uses carbon fibers as reinforced fibers, and ensures pressure resistance (mechanical strength) of the hydrogen storage tank 11. The fiber reinforced resin layer 15 is formed by winding a carbon fiber bundle impregnated with resin such as unsaturated polyester resin or epoxy resin on the liner 14 into a helical winding layer or a hoop winding layer and then thermally curing the resin. The fiber reinforced resin layer 15 is not formed on the outer end face of the cap 17 and on the plug 27 in the hydrogen storage tank 11 of the present embodiment. In other words, the two ends of the hydrogen storage tank 11 define regions where the fiber reinforced resin layer 15 is not formed (non-formation region).

The heat exchanger 13 is attached to the cap 17. The heat exchanger 13 includes a heating medium pipe 19, which extends through the hydrogen storage tank 11 in the longitudinal direction (left and right directions in FIG. 1) and bent into a substantially U-shape form, and a disk-shaped header 20, which is the portion attached to the cap 17. The header 20 is fixed to the cap 17 by screws with a sealing material arranged between the header 20 and the cap 17. The heating medium pipe 19, through which heating medium flows, is formed by a single pipe and has ends that are fixed to the header 20 through brazing, welding, or the like. The heating medium pipe 19 is fixed to the header 20 in a cantilevered state in the tank body 12. A plurality of heat transfer fins 21 are joined to the heating medium pipe 19, and the heat transfer fins 21 are arranged along the longitudinal direction of the tank body 12. The heat transfer fins 21 have heat transfer surfaces that are orthogonal to the extending direction of the heating medium pipe 19, that is, the longitudinal direction of the tank body 12.

Hydrogen absorption alloy MH serving as a hydrogen absorption material is accommodated in the tank body 12. The hydrogen absorption alloy MH is in a powdered. The hydrogen absorption alloy MH is not filled in a concentrated state inside the tank body 12 but rather filled with spatial margin to allow the expansion of the hydrogen absorption alloy MH in the tank body 12.

The cap 17 includes a fitting portion 22, which is fitted to the opening 16, and a flange 23, which is formed around the fitting portion 22. The fitting portion 22 is annular. The cap 17 further includes a recess 22a into which the header 20 is fitted. The recess 22a is open towards the inside of the main body 14a. The cap 17 is fixed by screws to the main body 14a at the flange 23 with sealing material arranged between the cap 17 and the main body 14a. Passages 17a and 17b, which are in communication with the recess 22a, are also formed in the cap 17. A pipe that extends from a heating medium supplying unit (not shown) is connected to the passages 17a and 17b. The passages 17a and 17b are connected to the two ends of the heating medium pipe 19, that is, the inlet and the outlet of heating medium pipe 19 through flow passages (not shown) formed in the header 20. This enables the heating medium to be supplied from the heating medium supplying unit to the heating medium pipe 19. In the present embodiment, the heating medium is supplied from the heating medium supplying unit to the heating medium pipe 19 through the passage 17a, which is located at the upstream side, and is returned from the heating medium pipe 19 to the heating medium supplying unit through the passage 17b, which is located at the downstream side.

A gas supply pipe 24 serving as a sub-passage extends from the tank body 12 and functions as a passage for supplying inert gas to the tank body 12 (liner 14). The gas supply pipe 24, which has an end (outlet) that opens to the inside of the tank body 12, extends through the header 20 and the cap 17 and out of the tank body 12. The gas supply pipe 24 may be connected to a supply source of the inert gas, that is, a gas supplying unit (not shown). Nitrogen gas is used as the inert gas in the present embodiment. A filter 25 for preventing the hydrogen absorption alloy MH from moving out of the tank body 12 and into the gas supply pipe 24 is attached to the outlet of the gas supply pipe 24. The filter 25 is arranged in the tank body 12. An open-close valve 26 for opening and closing the gas supply pipe 24 is connected to the gas supply pipe 24. The supply of inert gas from the gas supplying unit to the tank body 12 is permitted when the open-close valve 26 is open with the gas supply pipe 24 connected to the gas supplying unit.

The plug 27 is fixed by screws to the opening 18 with a sealing material arranged between the plug 27 and the end face of the liner 14. A hydrogen supply-release pipe 28 serves as a main passage extending from the tank body 12 and functions as a passage for supplying hydrogen gas to the tank body 12 (liner 14) and as a passage for releasing hydrogen gas from the tank body 12 (liner 14). In other words, the hydrogen supply-release pipe 28 is used both as a hydrogen supply pipe and a hydrogen release pipe. The hydrogen supply-release pipe 28, which has an end that opens to the inside of the tank body 12, extends through the plug 27 and out of the tank body 12.

A filter 29 for preventing the hydrogen absorption alloy MH from moving out of the tank body 12 and into the hydrogen supply-release pipe 28 is attached to the end of the hydrogen supply-release pipe 28 that is located in the tank body 12. An open-close valve 30 for opening and closing the hydrogen supply-release pipe 28 is connected to the hydrogen supply-release pipe 28. The open-close valve 30 is connected to a flow passage switching valve (not shown). The passage switching valve may be connected to a pipe (passage) extending from a hydrogen supply unit, which is the supply source of the hydrogen gas, a pipe (passage) extending from a hydrogen consumption unit (e.g., fuel cell), which is where the hydrogen gas is sent to, and a pipe (passage) extending from a vacuum pump. These pipes are not shown in the drawings. The flow passage switching valve selectively communicates the tank body 12 to the hydrogen supply unit, the hydrogen consumption unit, or the vacuum pump.

The gas supply pipe 24 is arranged in the cap 17, and the hydrogen supply-release pipe 28 is arranged in the plug 27. That is, the gas supply pipe 24 and the hydrogen supply-release pipe 28 are arranged at opposite sides of the tank body 12 (extend from opposite sides). The gas supply pipe 24 and the hydrogen supply-release pipe 28 are arranged at the longitudinal ends of the tank body 12 and are spaced apart from each other by the length of the tank body 12 in the longitudinal direction. The hydrogen absorption alloy MH accommodated in the tank body 12 is subjected to the flow of hydrogen gas towards the hydrogen supply-release pipe 28 when hydrogen gas is being released from the tank body 12 through the hydrogen supply-release pipe 28.

The hydrogen storage tank 11 is installed in, for example, a fuel cell powered vehicle as a hydrogen supply source or the like. Normally, the open-close valve 26 keeps the gas supply pipe 24 closed. In this state, hydrogen gas is released from the hydrogen storage tank 11 and supplied to the fuel cell mounted on the fuel cell powered vehicle or filled into the hydrogen storage tank 11.

The hydrogen storage tank 11 is installed in a traverse state. The passages 17a and 17b in the cap 17 are connected to pipes extending from a heating medium supplying unit arranged in the fuel cell powered vehicle. The hydrogen supply-release pipe 28 extending from the plug 27 is connected to a pipe extending from the fuel cell via the open-close valve 30 and the flow passage switching valve. Antifreeze liquid or long life coolant of which main component is, for example, ethylene glycol is used as the heating medium supplied from the heating medium supplying unit to the heating medium pipe 19. Alternatively, used after the heating medium cools the fuel cell, the heating medium may be supplied to the heating medium pipe 19.

When using hydrogen gas in the fuel cell, the open-close valve 30 of the hydrogen supply-release pipe 28 opens, and the flow passage switching valve switches so that the tank body 12 is in communication with the fuel cell. This permits the supply of hydrogen gas in the tank body 12 to the fuel cell through the hydrogen supply-release pipe 28. In this state, if the pressure in the hydrogen storage tank 11 is higher than the equilibrium pressure of the hydrogen absorption alloy MH, hydrogen gas is not released from the hydrogen absorption alloy MH. Hydrogen gas in the tank body 12 that is not absorbed in the hydrogen absorption alloy MH is released from the hydrogen supply-release pipe 28. Hydrogen gas is released from the hydrogen absorption alloy MH if the pressure in the hydrogen storage tank 11 becomes lower than or equal to the equilibrium pressure.

Since the release of hydrogen gas is an endothermic reaction, the hydrogen absorption alloy MH consumes its heat to release the hydrogen gas unless the heat necessary for releasing the hydrogen gas is supplied to the hydrogen absorption alloy MH. This lowers the temperature of the hydrogen absorption alloy MH and slows the reaction speed of the hydrogen gas release. However, when releasing hydrogen gas, the heated heating medium flows through the passage 17a, the heating medium pipe 19, and the passage 17b. Thus, the heat of the heating medium is supplied to the hydrogen absorption alloy MH via the heating medium pipe 19 and the heat transfer fins 21. This suppresses the decrease in the temperature of the hydrogen absorption alloy MH, and the reaction of the hydrogen gas release proceeds smoothly. The hydrogen gas released from the hydrogen absorption alloy MH is supplied to the fuel cell through the hydrogen supply-release pipe 28.

When filling hydrogen gas into the hydrogen storage tank 11, that is, when the hydrogen absorption alloy MH absorbs hydrogen gas, the pipe extending from a hydrogen supply unit (hydrogen curdle) at, for example, a hydrogen station is connected to the flow passage switching valve, and the flow passage switching valve is switched so that the tank body 12 is in communication with the hydrogen supply unit. This supplies the hydrogen gas from the hydrogen supply unit to the hydrogen storage tank 11. The hydrogen gas supplied to the hydrogen storage tank 11 reacts with the hydrogen absorption alloy MH and is absorbed in the hydrogen absorption alloys MH as hydrides. Since the absorption reaction of the hydrogen gas is an exothermic reaction, the absorption reaction does not proceed smoothly unless the heat generated during the absorption reaction of the hydrogen gas is removed. However, when filling the hydrogen gas, the cool heating medium flows through the passage 17a, the heating medium pipe 19, and the passage 17b. The heating medium thus prevents the temperature of the hydrogen absorption alloy MH from increasing. Thus, the absorption of the hydrogen gas is efficiently performed.

The procedures for replacing the open-close valve. 30 connected to the hydrogen supply-release pipe 28 will now be described with reference to FIG. 2.

First, a hydrogen releasing operation in step S10 is performed. In the hydrogen releasing operation, hydrogen (including hydrogen that is not absorbed in the hydrogen absorption alloy MH, and hydrogen absorbed in the hydrogen absorption alloy MH as hydride) in the tank body 12 is released from the tank body 12. Specifically, the pipe extending from the vacuum pump is connected to the flow passage switching valve, and the flow passage switching valve is switched so that the tank body 12 is in communication with the vacuum pump. The open-close valve 30 of the hydrogen supply-release pipe 28 is operated to open the hydrogen supply-release pipe 28. In this state, the open-close valve 26 of the gas supply pipe 24 is closed. Hydrogen gas is thus released from the tank body 12. Heated heating medium flows through the heating medium pipe 19 to accelerate the reaction for releasing hydrogen gas from the hydrogen absorption alloy MH. The hydrogen gas is then drawn out of the tank body 12 by the vacuum pump, and the tank body 12 is properly degassed.

Then, an inert gas supplying operation in step S20 is performed. In the inert gas supplying operation, inert gas (nitrogen gas in the present embodiment) is supplied to the tank body 12, from which hydrogen gas has been drawn out, and the tank body 12 is filled with inert gas. Specifically, the open-close valve 26 of the gas supply pipe 24 is operated to open the gas supply pipe 24 with the gas supply pipe 24 connected to the gas supplying unit. This supplies the inert gas from the gas supplying unit to the tank body 12. In this state, the open-close valve 30 of the hydrogen supply-release pipe 28 is closed. Thus, the inert gas flows through the tank body 12 and the hydrogen supply-release pipe 28 to the open-close valve 30. The inert gas is supplied so that the inner pressure of the tank body 12 becomes higher than or equal to the atmospheric pressure (e.g., 0.15 MPa to 0.2 MPa).

Then, a valve replacement operation in step S30 is performed. In the valve replacement operation, the open-close valve 30 of the hydrogen supply-release pipe 28 is replaced with a new open-close valve 30. Specifically, the open-close valve 30 is detached from the hydrogen supply-release pipe 28, and the new open-close valve 30 is attached to the hydrogen supply-release pipe 28 while continuing the inert gas supplying operation. The new open-close valve 30 is attached to the hydrogen supply-release pipe 28 in a closed state. The tank body 12 is maintained in the inert gas filled state since the inert gas is being continuously supplied to the tank body 12 while the open-close valve 30 is being replaced. That is, the interior of the tank body 12 is constantly maintained in a state filled with inert gas even if the inert gas leaks out from the tank body 12 when replacing the open-close valve 30.

Then, a hydrogen supplying operation in step S40 is performed. In the hydrogen supplying operation, the hydrogen gas is supplied to the hydrogen storage tank 11 after the open-close valve 30 is replaced, and the hydrogen storage tank 11 is refilled with hydrogen gas. Specifically, the open-close valve 26 of the gas supply pipe 24 is first operated to close the gas supply pipe 24. That is, the supply of inert gas to the tank body 12 is stopped. The open-close valve 30 (replaced open-close valve 30) of the hydrogen supply-release pipe 28 is operated to open the hydrogen supply-release pipe 28, and the inert gas inside the tank body 12 is discharged through the hydrogen supply-release pipe 28. The vacuum pump is used when discharging the inert gas in the same manner as during the hydrogen releasing operation of step S10 to properly degas the tank body 12. Subsequently, the flow passage switching valve is switched so that the tank body 12 is in communication with the hydrogen supply unit, and hydrogen gas is supplied from the hydrogen supply unit to the tank body 12. The hydrogen gas absorption reaction of the hydrogen absorption alloy MH is accelerated by cooled heating medium flowing through the heating medium pipe 19, and the tank body 12 is rapidly filled with hydrogen gas. The replacement of the open-close valve 30 is completed after the tank body 12 is filled with hydrogen gas at a predetermined pressure.

The present embodiment has the advantages described below.

(1) The hydrogen storage tank 11 accommodating the hydrogen absorption alloy MH includes the hydrogen supply-release pipe 28 and the gas supply pipe 24, which are independent from each other. The hydrogen supply-release pipe 28 is used to supply hydrogen gas to the tank body 12 and release hydrogen gas from the tank body 12, and the gas supply pipe 24 is used to supply inert gas to the tank body 12. The tank body 12 maintains a state filled with inert gas when replacing the open-close valve 30 arranged at the hydrogen supply-release pipe 28 by continuously supplying inert gas to the tank body 12 from the gas supply pipe 24. This stops air from entering the tank body 12 through the hydrogen supply-release pipe 28 and prevents the hydrogen absorption alloy MH in the tank body 12 from oxidizing and deteriorating when replacing the open-close valve 30.

(2) The hydrogen supply-release pipe 28 and the gas supply pipe 24 face each other with the tank body 12 located in between. In other words, the hydrogen supply-release pipe 28 and the gas supply pipe 24 are arranged at opposite sides of the tank body 12. When the hydrogen gas in the tank body 12 is released through the hydrogen supply-release pipe 28, the inlet of the gas supply pipe 24 in the tank body 12 is located at the most upstream part with respect to the flow of the hydrogen gas in the tank body 12. The hydrogen absorption alloy MH in the tank body 12 is subjected to the flow of hydrogen gas towards the hydrogen supply-release pipe 28 and is not likely to flow towards the inlet of the gas supply pipe 24. The hydrogen absorption alloy MH is thus not likely to enter the gas supply pipe 24, and the hydrogen absorption alloy MH is not likely to deposit in the open-close valve 26 arranged in gas supply pipe 24. This prevents the open-close valve 26 from failing to function since there is no deposit of the hydrogen absorption alloy MH.

(3) The hydrogen supply-release pipe 28 and the gas supply pipe 24 are arranged at regions of the hydrogen storage tank (tank body 12) free from the fiber reinforced resin layer 15. Thus, the reinforcement effect of the hydrogen storage tank 11 by the fiber reinforced resin layer 15 is not lowered and the resistance to pressure of the hydrogen storage tank 11 is ensured as compared when arranging the gas supply pipe 24 or the like at a region where the fiber reinforced resin layer 15 is formed.

(4) When replacing the open-close valve 30, the inert gas is supplied to the tank body 12 so that the inner pressure of the tank body 12 is maintained higher than or equal to the atmospheric pressure. This prevents the flow of air into the tank body 12 even when the open-close valve 30 is detached from the hydrogen supply-release pipe 28 for replacement.

(5) The hydrogen absorption alloy MH is accommodated in the tank body 12. Therefore, in comparison with when the hydrogen storage tank does not include the hydrogen absorption alloy, the amount of hydrogen gas that can be filled in the tank body is two times greater under the same hydrogen charging pressure. This increases the distance the hydrogen vehicle can travel with a single hydrogen charge when using the hydrogen storage tank 11 of the present embodiment.

(6) The hydrogen absorption alloy MH is filled into the tank body 12 with spatial margin. This sufficiently tolerates the expansion of the hydrogen absorption alloy MH during the absorption of the hydrogen gas and prevents stress from acting on each part of the hydrogen storage tank 11 as the hydrogen absorption alloy MH expands. In particular, the hydrogen storage tank 11 of the present embodiment incorporates the heat exchanger 13, which includes the heating medium pipe 19 through which the heating medium flows, and the plurality of heat transfer fins 21 joined to the heating medium pipe 19. The strength of the heat exchanger 13 is relatively low. However, deformation or breakage of the heat exchanger 13 is suppressed since stress is prevented from acting on the heat exchanger 13 when the hydrogen absorption alloy MH expands.

Second Embodiment

Figure 3:
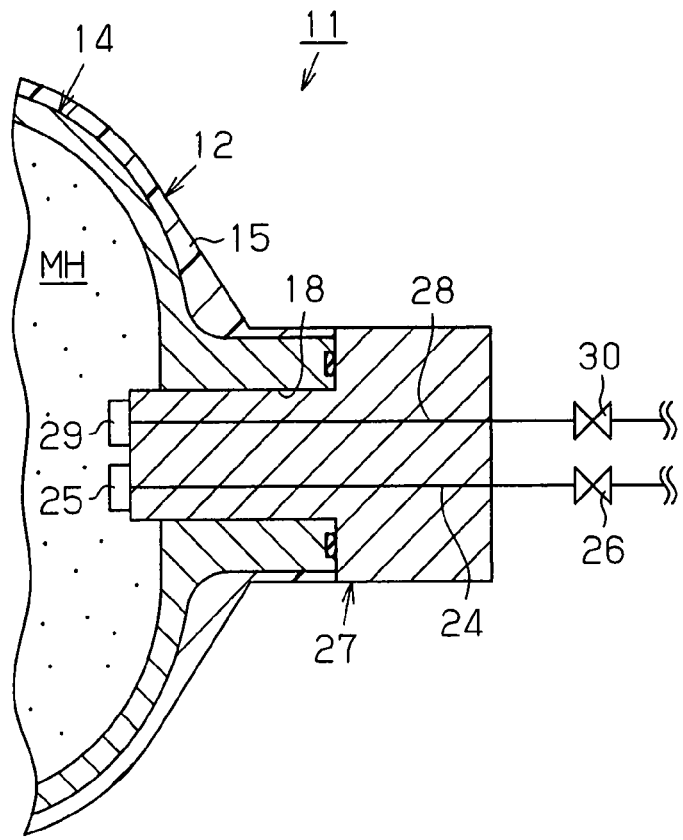
FIG. 3 is a schematic partially enlarged cross-sectional view of a hydrogen storage tank according to a second embodiment of the present invention.

A second embodiment of the present invention will now be described with reference to FIG. 3 focusing on the differences from the first embodiment.

In the present embodiment, the gas supply pipe 24 is arranged in the plug 27 instead of in the cap 17. That is, the hydrogen supply-release pipe 28 and the gas supply pipe 24 extend in parallel from the plug 27. The open-close valves 26 and 30 arranged in pipes 24 and 28, which are arranged in parallel, are located close to each other. The functions of the hydrogen storage tank 11 and the replacement procedures of the open-close valve 30 of the second embodiment are the same as the first embodiment.

The present embodiment has the advantages described below in addition to the advantages (1) and (3) to (6) of the first embodiment.

(7) The hydrogen supply-release pipe 28 and the gas supply pipe 24 are arranged in parallel, and the pipes 24 and 28 are located near each other. The open-close valves 26 and 30 are also located near each other. Therefore, the open-close valves 26 and 30 are easy to operate when replacing the open-close valve 30. This facilitates the replacement.

(8) The manufacturing of the hydrogen storage tank 11 is simplified since the hydrogen supply-release pipe 28 and the supply pipe 24 are arranged in the same member, or the plug 27, as compared to when the hydrogen supply-release pipe 28 and the supply pipe 24 are arranged in different members.

Third Embodiment

A third embodiment of the present invention will now be described with reference to FIG. 4 focusing on differences from the first embodiment.

In the hydrogen storage tank 40 of the present embodiment, the fiber reinforced resin layer 15 is not formed on the outer surface of the liner 14, and the tank body 12 is formed by only the liner 14. The gas supply pipe 24 extends through the main body 14a of the liner 14. The gas supply pipe 24 is welded and fixed to the main body 14a in a state inserted into an attachment hole, which extends through the outer wall of the main body 14a, so as to maintain the hermetic seal of the tank body 12. The gas supply pipe 24 is arranged on the main body 14a closer to the cap 17 and spaced apart from the hydrogen supply-release pipe 28. The functions of the hydrogen storage tank and the replacement procedures of the open-close valve 30 of the third embodiment are the same as the first embodiment. The present embodiment has advantages (1), (2), and (4) to (6) of the first embodiment.

The above embodiments may be modified as below.

The hydrogen supply-release pipe 28 may be divided into a hydrogen supply pipe and a hydrogen release pipe, which are independent from each other. That is, the main passage may be formed by the hydrogen supply pipe and the hydrogen release pipe that are independent from each other.

In each of the first and second embodiments, the gas supply pipe 24 may be arranged at a region of the hydrogen storage tank 11 including the fiber reinforced resin layer 15 if the resistance to pressure of the tank 11 can be ensured. That is, the gas supply pipe 24 may extend through the fiber reinforced resin layer 15 to be arranged in the liner 14.

In the third embodiment, the gas supply pipe 24 may be arranged in the cap 17 or the plug 27. Alternatively, the gas supply pipe 24 may be arranged at any region of the main body 14a of the liner 14. For example, the gas supply pipe 24 may be arranged at the region of the main body 14a closer to the plug 27 or may be arranged at the middle or the vicinity thereof in the longitudinal direction of the liner 14.

The inert gas supplied to the tank body 12 when replacing the open-close valve 30 is a chemically inert gas and includes nitrogen in addition to noble gas such s helium, argon, neon, etc. It is preferred that the inert gas that is used has a higher specific gravity than hydrogen gas.

Figure 2:
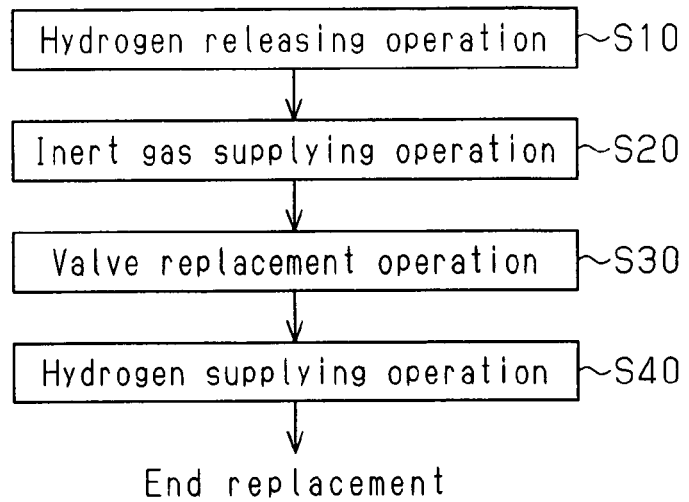
FIG. 2 is a flowchart illustrating the procedures for replacing an open-close valve.

The replacement procedures illustrated in FIG. 2 may be employed when replacing the open-close valve 26 arranged on the gas supply pipe 24. In this case, the hydrogen gas is released from the gas supply pipe 24 in the hydrogen releasing operation of step S10, and the inert gas is supplied from the hydrogen supply-release pipe 28 in the inert gas supplying operation of step S20. Furthermore, the open-close valve 26 is replaced while continuously supplying the inert gas from the hydrogen supply-release pipe 28 in the valve replacement operation of step S30.

The heat exchanger 13 only needs to include the heating medium pipe 19 through which the heating medium flows, and the heat transfer fins 21 may have any shape (e.g., circular, corrugated, or any other shape). The heat transfer fins 21 may be omitted.

The heating medium pipe 19 does not have to be bent to be U-shaped. The heating medium pipe 19 may be bent a plurality of times so that the heating medium travels back and forth a number of times in the longitudinal direction of the tank body 12. Alternatively, the heating medium pipe 19 may be formed by a pair of linear pipes each having one end (basal end) fixed to the header 20 and the other end (distal end) connected to a block member including a flow passage.

The heat exchanger 13 does not have to be fixed to the cap 17 by the header 20, and an end of the heating medium pipe 19 may directly be fixed to the cap 17.

The number of the heating medium pipe 19 in the heat exchanger 13 is not limited to one and may be more than one.

The heat exchanger 13 may be supported by a supporting member arranged in the tank body 12.

The hydrogen storage tank does not need to include the heat exchanger.

The liner 14 does not have to have a divided structure that includes the cap 17. For example, the heat exchanger 13 may be attached to one end of the liner 14, and the other end of the liner 14 may be narrowed through a spinning process.

The heating medium does not have to have ethylene glycol as the main component. For example, water may be the main component.

The hydrogen storage tank does not have to be installed and used in a fuel cell powered vehicle and may be applied to the hydrogen source of a hydrogen engine or to a heat pump. The hydrogen storage tank may also be used for the hydrogen source of a household power supply when using the fuel cell as a household power supply.

The reinforced fiber of the fiber reinforced resin is not limited to carbon fiber and other fibers generally known to have high elasticity and high strength such as glass fiber, silicon carbide ceramic fiber, aramid fiber, etc. may be used as the reinforced fiber.

The material of the liner 14 is not limited to aluminum alloy and may be a metal that ensures hermetic seal and has the same specific gravity as aluminum. Further, the material of the liner 14 is not limited to metal and may be a synthetic resin such as polyamide or high density polyethylene.

The hydrogen absorption material is not limited to hydrogen absorption alloy. Monolayer carbon nanotube or activated carbon fiber may be used as the hydrogen absorption material.

In the hydrogen supplying operation of step S40 in FIG. 2, the hydrogen gas may be supplied from the hydrogen supply-release pipe 28 to the tank body 12 when the gas supply pipe 24 is open. In this case, the tank body 12 may be filled with hydrogen gas while lowering the concentration of the inert gas by supplying the hydrogen gas to the tank body 12 while collecting gas emitted from the gas supply pipe 24 and closing the gas supply pipe 24 at a predetermined timing.

The invention claimed is:

1. A method for replacing an open-close valve for a hydrogen storage tank, wherein the hydrogen tank includes a tank body accommodating hydrogen absorption material and a main passage used to supply hydrogen gas to the tank body and release hydrogen gas from the tank body, and the open-close valve is connected to the main passage to open and close the main passage, the method comprising:

arranging a sub-passage in the hydrogen storage tank independently from the main passage;

releasing hydrogen gas from the tank body through the main passage by opening the main passage with the open-close valve in a state in which the sub-passage is closed;

supplying inert gas through the sub-passage to the tank body from which hydrogen gas has been released by opening the sub-passage;

replacing the open-close valve while continuing to supply inert gas to the tank body;

discharging inert gas from the tank body through the main passage or the sub-passage after the open-close valve is replaced; and supplying hydrogen gas to the tank body through the main passage after the open- close valve is replaced.

2. The method according to claim 1, further comprising:

applying heat of a heating medium to the hydrogen absorption material by circulating the heating medium through the tank body when discharging hydrogen gas from the tank body.

3. The method according to claim 2, further comprising:

cooling the hydrogen absorption material with a heating medium by circulating the heating medium through the tank body when supplying hydrogen gas to the tank body.

4. The method according to claim 2, further comprising:
supplying inert gas to the tank body so that the inner pressure of the tank body is kept higher than or equal to atmospheric pressure when replacing the open-close valve.

5. The method according to claim 1, further comprising:
cooling the hydrogen absorption material with a heating medium by circulating the heating medium through the tank body when supplying hydrogen gas to the tank body.

6. The method according to claim 5, further comprising:
supplying inert gas to the tank body so that the inner pressure of the tank body is kept higher than or equal to atmospheric pressure when replacing the open-close valve.

7. The method according to claim 1, further comprising:
supplying inert gas to the tank body so that the inner pressure of the tank body is kept higher than or equal to atmospheric pressure when replacing the open-close valve.

* * * * *